(12) United States Patent
Li et al.

(10) Patent No.: US 10,412,761 B2
(45) Date of Patent: *Sep. 10, 2019

(54) DOWNLINK CHANNEL ACCESS FOR NON-OPERATOR DEVICES

(71) Applicant: AVAGO TECHNOLOGIES GENERAL IP (SINGAPORE) PTE. LTD., Singapore (SG)

(72) Inventors: Yong Li, San Diego, CA (US); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,045

(22) Filed: Nov. 14, 2017

(65) Prior Publication Data

US 2018/0084577 A1    Mar. 22, 2018

Related U.S. Application Data

(63) Continuation of application No. 14/696,329, filed on Apr. 24, 2015, now Pat. No. 9,848,440.

(60) Provisional application No. 61/984,657, filed on Apr. 25, 2014.

(51) Int. Cl.

| | | |
|---|---|---|
| *H04L 12/40* | (2006.01) | |
| *H04W 74/00* | (2009.01) | |
| *H04W 76/11* | (2018.01) | |
| *H04W 28/16* | (2009.01) | |
| *H04W 88/04* | (2009.01) | |
| *H04W 88/06* | (2009.01) | |
| *H04W 16/14* | (2009.01) | |

(52) U.S. Cl.
CPC ......... *H04W 74/006* (2013.01); *H04W 28/16* (2013.01); *H04W 76/11* (2018.02); *H04W 88/04* (2013.01); *H04W 16/14* (2013.01); *H04W 88/06* (2013.01)

(58) Field of Classification Search
USPC ....................................................... 370/438
See application file for complete search history.

(56) References Cited

U.S. PATENT DOCUMENTS

| | | | |
|---|---|---|---|
| 9,848,440 | B2 * | 12/2017 | Li ........................ H04W 74/006 |
| 2006/0159073 | A1 | 7/2006 | Chun |
| 2010/0223321 | A1 | 9/2010 | Runstedler et al. |
| 2012/0155442 | A1 | 6/2012 | Haddad et al. |

(Continued)

*Primary Examiner* — Phuongchau Ba Nguyen
(74) *Attorney, Agent, or Firm* — Morgan, Lewis & Bockius LLP (57) ABSTRACT

A device for providing downlink channel access for non-operator devices includes at least one processor that is configured to establish a local connection with an operator device that is serviced by a network operator. The at least one processor is configured to provide, to the operator device over the local connection, a request to establish a connection to a network, the request comprising a destination address. The at least one processor is configured to receive, from the operator device over the local connection, control information for reception of a downlink channel provisioned by the network operator for the operator device. The at least one processor is configured to receive downlink data associated with the destination address on the downlink channel.

20 Claims, 6 Drawing Sheets

(56) References Cited

U.S. PATENT DOCUMENTS

| | | |
|---|---|---|
| 2013/0286889 A1 | 10/2013 | Cherian et al. |
| 2014/0349630 A1* | 11/2014 | Hyde .................... H04B 7/026 455/418 |
| 2015/0092701 A1 | 4/2015 | Horn et al. |
| 2015/0312888 A1 | 10/2015 | Li et al. |
| 2016/0337346 A1* | 11/2016 | Momchilov ............ G06F 21/34 |

* cited by examiner

DOWNLINK CHANNEL ACCESS FOR NON-OPERATOR DEVICES

CROSS-REFERENCE TO RELATED APPLICATIONS

This application is a continuation of U.S. patent application Ser. No. 14/696,329, entitled "Downlink Channel Access for Non-Operator Devices", filed Apr. 24, 2015, which claims the benefit of U.S. Provisional Patent Application Ser. No. 61/984,657, entitled "Supplementary Downlink for Non-operator Devices," filed on Apr. 25, 2014, which are hereby incorporated by reference in their entirety for all purposes.

TECHNICAL FIELD

The present description relates generally to downlink channel access for non-operator devices and also relates to providing supplementary downlink channel access for non-operator devices.

BACKGROUND

Cellular communication systems, such as long-term evolution (LTE) communication systems, use licensed spectrum bands for wireless transmission. However, the licensed bands may be limited in terms of total available bandwidth, and additional licensed bands may be expensive to obtain. Thus, with the dramatic increase of cellular data traffic, including LTE data traffic, the available licensed spectrum resources may become constrained. In order to increase the spectrum available for cellular data traffic, some have suggested utilizing the 5 Gigahertz (GHz) unlicensed band (that may be used for Wi-Fi data traffic) for cellular data traffic, e.g. LTE-U (unlicensed).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system allows a client device that is not serviced by a mobile network operator, but can access cellular transmissions in certain frequency bands (e.g. unlicensed frequency bands), to receive quality-assured services offered by the mobile network operator via the accessible frequency bands. In particular, the subject system allows a client device that is not serviced by a mobile network operator, e.g. a non-operator device, to securely pair with a device that is serviced by the mobile network operator, e.g. an operator device, such as via a local Bluetooth or Wi-Fi connection. The non-operator device transmits a request for a connection to a network with a particular requested service configuration (which may include QoS parameters) to the operator device through the local connection, and the operator device facilitates configuring the connection to the network via the mobile network operator.

The downlink for the connection is provided through a supplementary downlink channel, which is provisioned through carrier aggregation with a primary downlink channel and control channel of the operator device, in a frequency band that is accessible to the non-operator device, such as an unlicensed frequency band. The operator device provides the non-operator device with control information for accessing the supplementary downlink channel via the local connection. The non-operator device then receives downlink data for the connection through the supplementary downlink channel, without having to directly access the primary downlink or control channels of the operator device. The non-operator device transmits uplink data for the connection to the operator device via the local connection. The operator device relays the uplink data to the network, e.g. via the uplink channel of the operator device. Thus, the subject system allows the non-operator device to access QoS assured services of the mobile network operator via the supplementary downlink channel of the operator device and the uplink relay provided by the operator device. In one or more implementations, the subject system is implemented by the non-operator and operator devices on a per application session basis. Thus, the subject system may be application-driven where the data transmission on the unlicensed spectrum is associated with a particular application.

Figure 1:
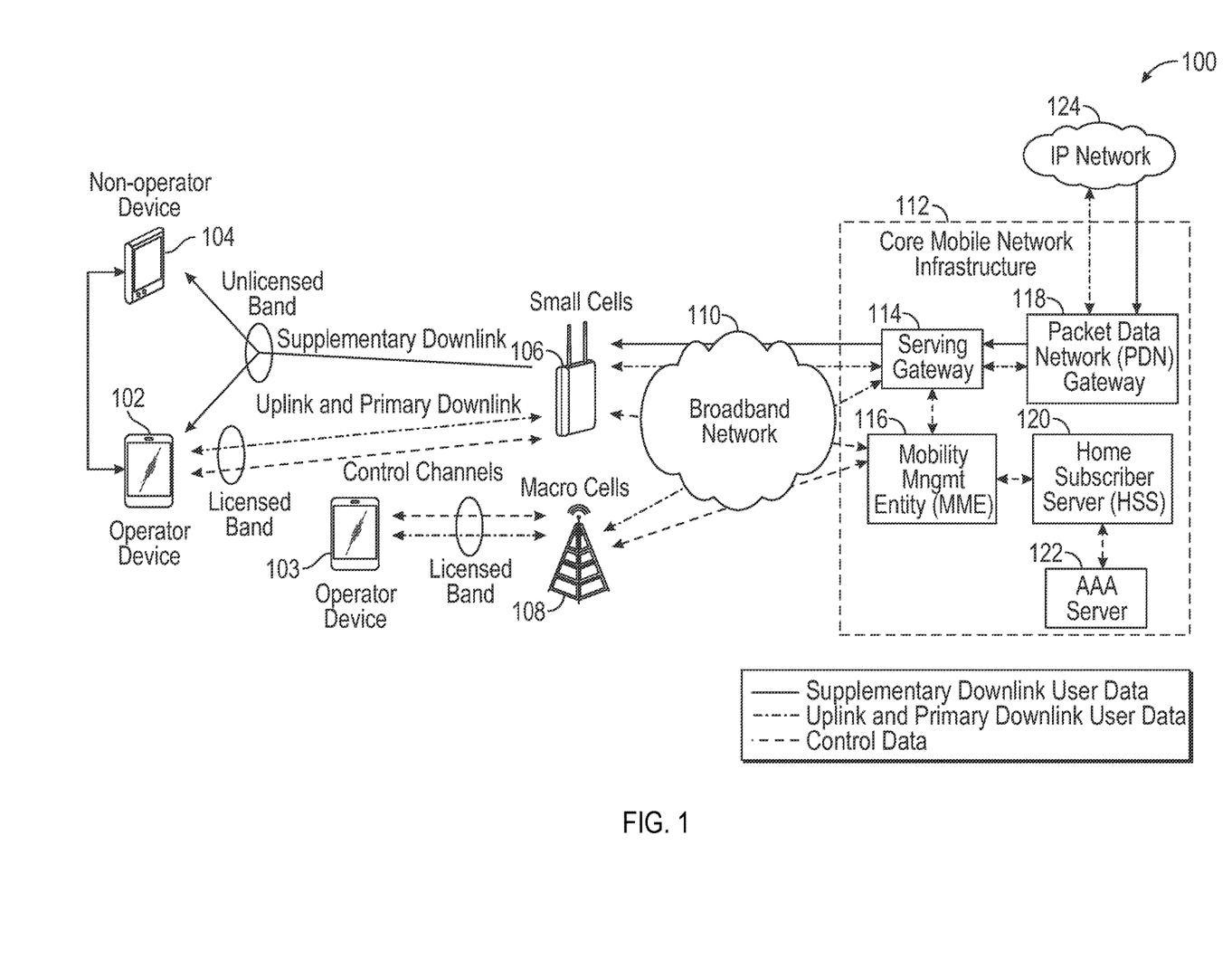
FIG. 1 illustrates an example network environment in which a system for downlink channel access for non-operator devices may be implemented in accordance with one or more implementations.

FIG. 1 illustrates an example network environment 100 in which a system for downlink channel access for non-operator devices may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes operator devices 102, 103, a non-operator device 104, one or more small cell access points 106, one or more macrocell access points 108, a broadband network 110, a core mobile network infrastructure 112, and an internet protocol (IP) network 124, such as the Internet. For explanatory purposes, the example network environment 100 is described in the context of a cellular network; however, the subject system is not limited to cellular networks and is also applicable to, for example, coaxial networks, such as Multimedia over Coax Alliance (MoCA) networks, power line networks, Wi-Fi networks, and other networks that utilize a shared network medium.

The core mobile network infrastructure 112 is associated with a mobile network operator that services the operator devices 102, 103, e.g. via the access points 106, 108, but does not service the non-operator device 104. The core mobile network infrastructure 112 includes a serving gateway 114, a mobility management entity (MME) 116, a packet data network (PDN) gateway 118, a home subscriber server (HSS) 120, and an authentication, authorization, and accounting (AAA) server 122.

The operator devices 102, 103 access the IP network 124, and/or services coupled thereto, such as an IP multimedia subsystem, via the access points 106, 108, the broadband network 110, and the core mobile network infrastructure 112. The operator device 103 can access downlink transmissions of the macrocell access point 108 using a licensed frequency band, while the operator device 102 can access downlink transmissions of the small cell access point 106 using both a licensed frequency band and an unlicensed frequency band, such as a 5 GHz LTE-U frequency band. For example, the small cell access point 106 can perform carrier aggregation (CA) across the licensed and unlicensed bands with a first component carrier (CC) on a licensed band, e.g. 2.1 GHz, carrying the primary downlink and control channels, and a second component carrier on an unlicensed band, e.g. 5 GHz, carrying a supplementary downlink channel. In one or more implementations, the primary downlink channel is used for voice and QoS-sensitive data while the supplementary downlink channel is used for best effort data. One or more of the operator devices 102, 103 may establish uplink and control channels on a licensed frequency band, such as 1.7 GHz; however, in one or more implementations, one or more of the operator devices 102, 103 establishes an uplink and/or control channel on an unlicensed frequency band.

The access points 106, 108 may also be referred to as base stations, and the small cell access point 106 may be a femtocell, microcell, or picocell access point. The access points 106, 108 are coupled to the core mobile network infrastructure 112 via the broadband network 110, which may include one or more network devices, such as switch devices, router devices, etc., and/or may utilize one or more network technologies, such as coaxial networking, e.g. implementing the Data Over Cable Service Interface Specification (DOCSIS), fiber optic networking, digital subscriber line (DSL) networking, and the like.

In the core mobile network infrastructure 112, the serving gateway 114 terminates the user data planes of the macrocells and small cells, while the MME 116 terminates the control planes of the macrocells and small cells. The HSS 120 provides service control and a user database for the mobile network, while the AAA server 122 performs authentication, authorization, and accounting for the mobile network. The PDN gateway 118 is an interface to the external IP network 124, and services coupled thereto, such as an IP multimedia subsystem that configures media sessions and maintains media-related applications.

The operator devices 102, 103 may be referred to as user equipment (UE), and may be, and/or may include, a mobile device, such as a smart phone, a tablet device, a computing device, such as a laptop, a communications device, such as a card, a USB device, etc., that is coupled to a computing device, or generally any wirelessly connectable device. The operator devices 102, 103 may include, for example, a cellular transmitter and a cellular receiver for cellular communications with the access points 106, 108 over licensed and/or unlicensed bands. The operator devices 102, 103 may be registered with the mobile network operator associated with the core mobile network infrastructure 112, e.g. such that the operator devices 102, 103 can authenticate and/or establish uplink and downlink channels with the access points 106, 108.

The non-operator device 104 may be a device that can receive downlink transmissions from the small cell access point 106 using cellular communications, such as LTE, over licensed and/or unlicensed bands, such as a 5 gigahertz (GHz) band, but that is not serviced by the mobile network operator associated with the core mobile network infrastructure 112 and therefore cannot authenticate with the access points 106, 108. In one or more implementations, the non-operator device 104 may be referred to as an off-the-shelf client device, and the non-operator device 104 may be, and/or may include, a mobile device, such as a smart phone, a tablet device, a computing device, such as a laptop, a communications device, such as a card, a USB device, etc., that is coupled to a computing device, or generally any wirelessly connectable device.

The non-operator device 104 may include, for example, a cellular receiver for receiving cellular communications from the small cell access point 106, but may not include a cellular transmitter for transmitting cellular communications to the small cell access point 106. The non-operator device 104 may not be registered with the mobile network operator associated with the core mobile network infrastructure 112, and therefore the non-operator device 104 may not be able to authenticate and/or establish uplink and downlink channels with the small cell access point 106. In one or more implementations, the non-operator device 104 may include a cellular transmitter, but since the non-operator device 104 is not serviced by the mobile network operator, the non-operator device 104 may not be authorized to transmit uplink data to the small cell access point 106.

The operator device 102 and the non-operator device 104 may establish, and/or communicate with each other via, a local connection, such as a Wi-Fi connection, a Bluetooth connection, a near field communication (NFC) connection, a Zigbee connection, etc. In one or more implementations, the operator device 102 and the non-operator device 104 may communicate via a Wi-Fi connection that is facilitated by the small cell access point 106, e.g. when the small cell access point 106 operates as a gateway device. However, although the non-operator device 104 may be able to communicate with the small cell access point 106 via a Wi-Fi connection, the non-operator device 104 may be unable to receive cellular transmissions from the small cell access point 106 with the necessary service assurance that can be provided over a cellular connection, such as over LTE, without facilitation from the operator device 102.

In operation, the non-operator device 104 establishes the local connection with the operator device 102, such as via Bluetooth and/or Wi-Fi, and authenticates with the operator device 102 via the local connection. In one or more implementations, the operator device 102 may communicate with the small cell access point 106 and/or the core mobile network infrastructure 112 to verify that the operator device 102 has been authorized to facilitate the non-operator device 104 with establishing a downlink channel from the small cell access point 106 on an unlicensed band in conjunction with, e.g. through carrier aggregation, a primary downlink channel of the operator device 102 on a licensed band.

The operator device 102 may then facilitate the non-operator device 104 with establishing a supplementary downlink channel from the small cell access point 106 for reception of downlink data. The supplementary downlink channel may facilitate a requested service configuration that is selected by the non-operator device 104, as is discussed further below with respect to FIG. 4. Upon establishing the supplementary downlink channel, the operator device 102 provides control information for accessing the supplementary downlink channel to the non-operator device 104 via the local connection. The non-operator device 104 can then receive downlink data for the connection via the supplementary downlink channel without needing to access the primary downlink and control channels of the operator device 102. The non-operator device 104 transmits uplink data to the operator device 102 via the local connection, and the operator device 102 uses its uplink channel to relay the uplink data to the small cell access point 106 for transmission to the core mobile network infrastructure 112 and the IP network 124.

Figure 2:
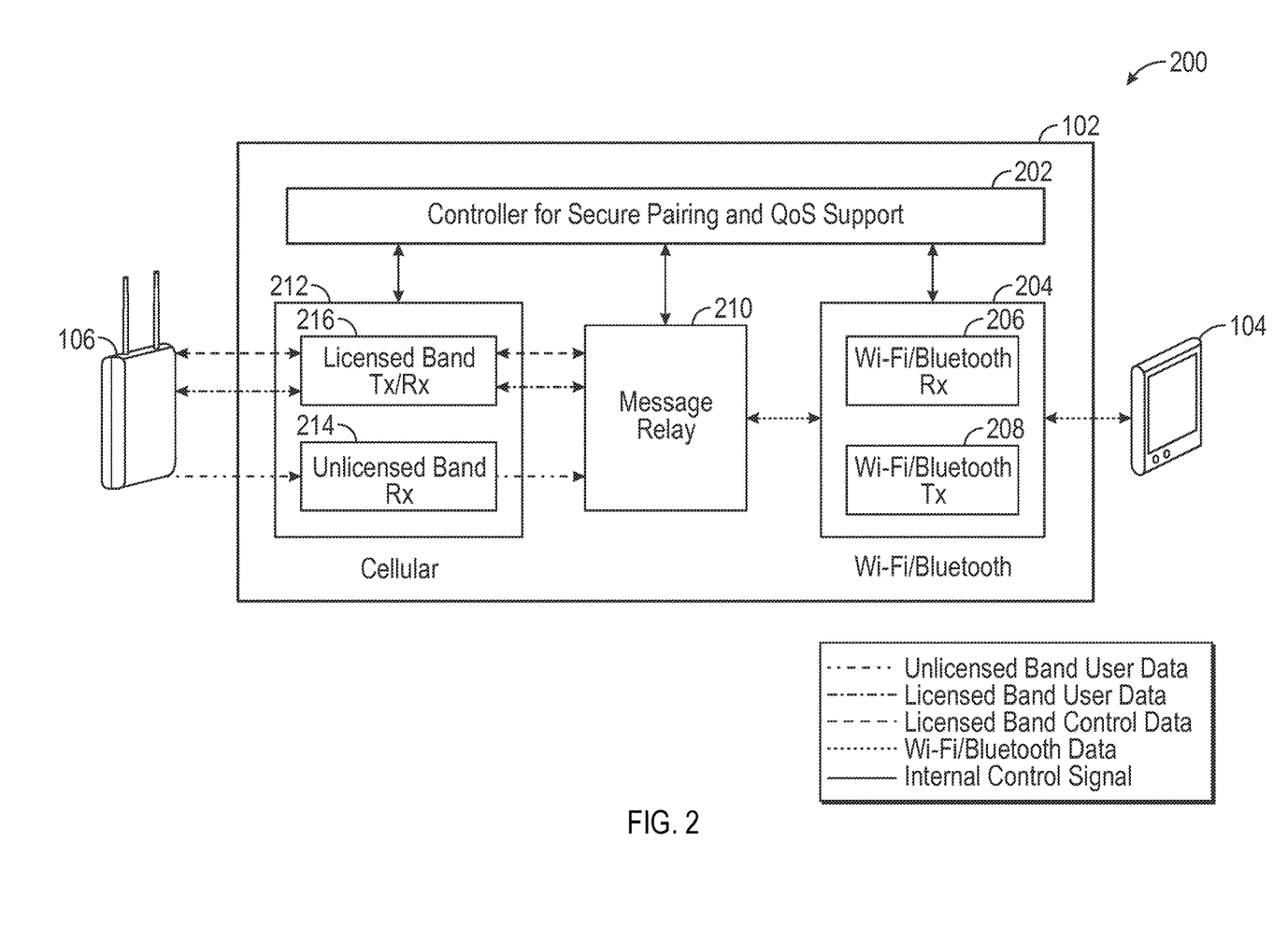
FIG. 2 illustrates an example operator device in a network environment in which a system for downlink channel access for non-operator devices may be implemented in accordance with one or more implementations.

FIG. 2 illustrates an example operator device 102 in a network environment 200 in which a system for downlink channel access for non-operator devices may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the operator device 102, the small cell access point 106, and the non-operator device 104. The operator device 102 includes a controller 202, a cellular communications module 212, a message relay module 210, and a Wi-Fi/Bluetooth transceiver 204. The cellular communications module 212 includes a licensed band transceiver 216, and an unlicensed band receiver 214. The Wi-Fi/Bluetooth transceiver 204 includes a Wi-Fi/Bluetooth receiver 206, and a Wi-Fi/Bluetooth transmitter 208.

In operation, the operator device 102 receives user data from the small cell access point 106 on downlink channels on unlicensed bands via the unlicensed band receiver 214, and the operator device 102 receives user data and control data from the small cell access point 106 on downlink channels on licensed bands via a receiver of the licensed band transceiver 216. The operator device 102 transmits user and control data to the small cell access point 106 via a transmitter of the licensed band transceiver 216 on uplink channels on licensed bands.

The operator device 102 establishes a local connection with the non-operator device 104 using the Wi-Fi/Bluetooth transceiver 204. For example, the operator device 102 may transmit Bluetooth low energy (BLE) advertiser messages, and/or beacon signals/messages, via the Wi-Fi/Bluetooth transmitter 208 to advertise that it can facilitate with configuring a supplementary downlink channel for the non-operator device 104. The non-operator device 104 receives the advertiser message and initiates a local connection with the operator device 102, which may then be established by the Wi-Fi/Bluetooth transceiver 204 of the operator device 102. The controller 202 provides for secure pairing for the local connection and QoS support.

Once the local connection is established, the operator device 102 receives a request from the non-operator device 104 for a connection to a destination address of a network, such as the IP network 124. The operator device 102 facilitates configuring a supplementary downlink channel on an unlicensed band for the connection via the licensed band transceiver 216. The operator device 102 provides the non-operator device 104 with control information for accessing the supplementary downlink channel via the local connection, e.g. using the Wi-Fi/Bluetooth transmitter 208. The control information may include frequency information, timing information, and/or any control information for accessing the supplementary downlink channel.

Once the supplementary downlink channel is established, the operator device 102 receives uplink user and/or control data from the non-operator device 104 via the Wi-Fi/Bluetooth transceiver 204, which passes the uplink user and control data to the message relay module 210. The message relay module 210 transmits the uplink user and/or control data to the licensed band transceiver 216, for transmission to the small cell access point 106, and consequently the core mobile network infrastructure 112 and the IP network 124. An example process of the operator device 102 in a system for providing downlink channel access for non-operator devices is discussed further below with respect to FIG. 5.

In one or more implementations, one or more of the controller 202, the cellular communications module 212, the licensed band transceiver 216, the unlicensed band receiver 214, the message relay module 210, the Wi-Fi/Bluetooth transceiver 204, the Wi-Fi/Bluetooth receiver 206, and/or the Wi-Fi/Bluetooth transmitter 208 may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
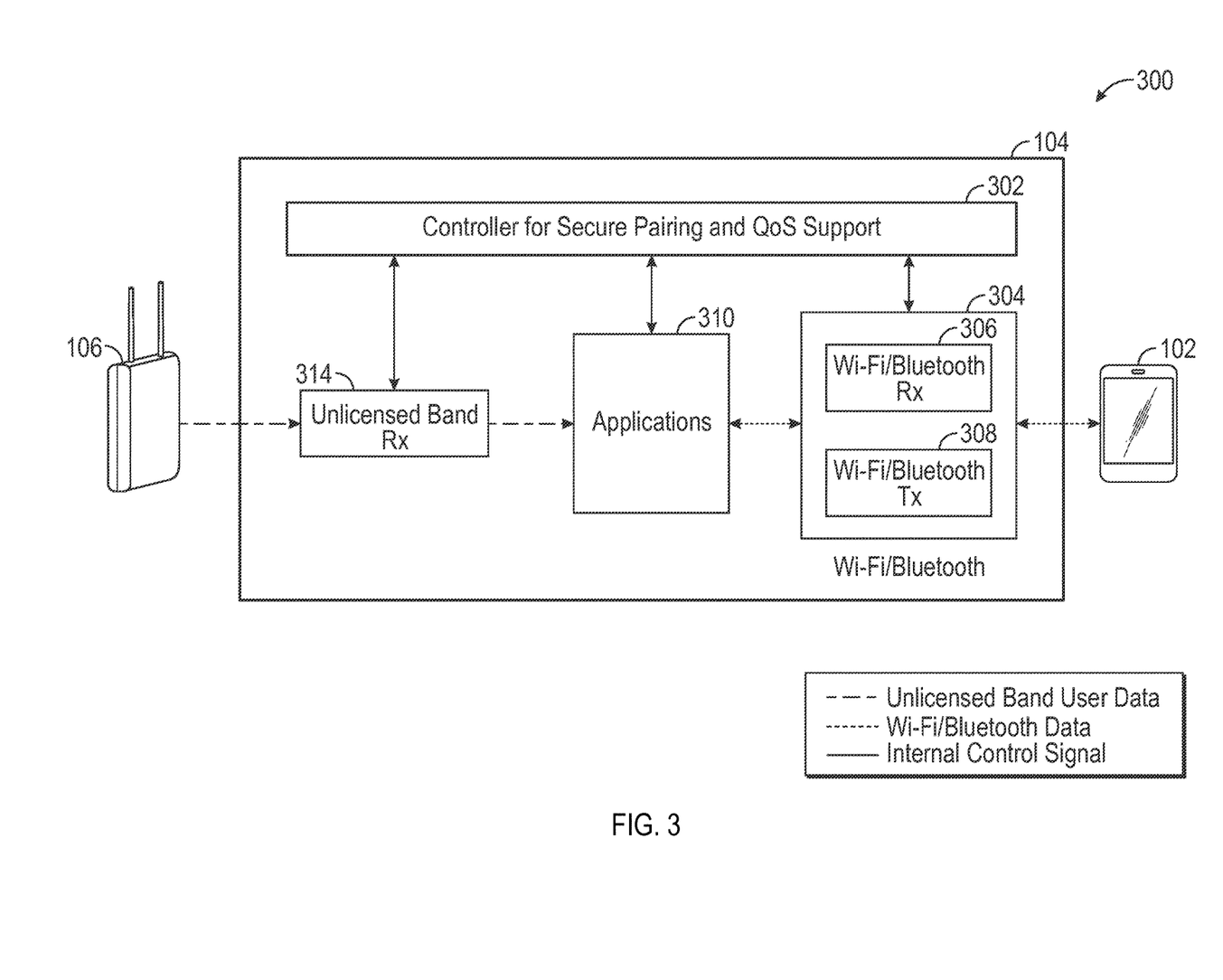
FIG. 3 illustrates an example non-operator device in a network environment in which a system for downlink channel access for non-operator devices may be implemented in accordance with one or more implementations.

FIG. 3 illustrates an example non-operator device 104 in a network environment 300 in which a system for downlink channel access for non-operator devices may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 300 includes the non-operator device 104, the operator device 102, and the small cell access point 106. The non-operator device 104 includes a controller 302, an unlicensed band receiver 314, an applications module 310, and a Wi-Fi/Bluetooth transceiver 304. The Wi-Fi/Bluetooth transceiver 304 includes a Wi-Fi/Bluetooth receiver 306, and a Wi-Fi/Bluetooth transmitter 308. The applications module 310 may be, and/or may include one or more processors and/or one or more processor circuits.

In operation, the non-operator device 104 receives a local request to establish a connection to a destination address of a network with a requested service configuration, such as from the applications module 310 for a particular application session. The non-operator device 104 establishes a local connection with the operator device 102 using the Wi-Fi/Bluetooth transceiver 304. The controller 202 provides for secure pairing for the local connection and QoS support. Once the local connection is established, the non-operator device 104 transmits the request for the connection to the destination address of the network with the requested service configuration to the operator device 102 via the local connection, e.g. using the Wi-Fi/Bluetooth transmitter 308. The non-operator device 104 receives control information for accessing a supplementary downlink channel of the small cell access point 106 from the operator device 102 via the local connection, e.g. using the Wi-Fi/Bluetooth receiver 306.

The non-operator device 104 receives the supplementary downlink channel for the connection from the small cell access point 106 via the unlicensed band receiver 314 and using the control information. The non-operator device 104 transmits uplink control and/or user data associated with the connection to the operator device 102 via the local connection, e.g. using the Wi-Fi/Bluetooth transmitter 308. An example process of the non-operator device 104 in a system for providing downlink channel access for non-operator devices is discussed further below with respect to FIG. 4.

In one or more implementations, one or more of the controller 302, the unlicensed band receiver 314, the applications module 310, the Wi-Fi/Bluetooth transceiver 304, the Wi-Fi/Bluetooth receiver 306, and/or the Wi-Fi/Bluetooth transmitter 308 may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 4:
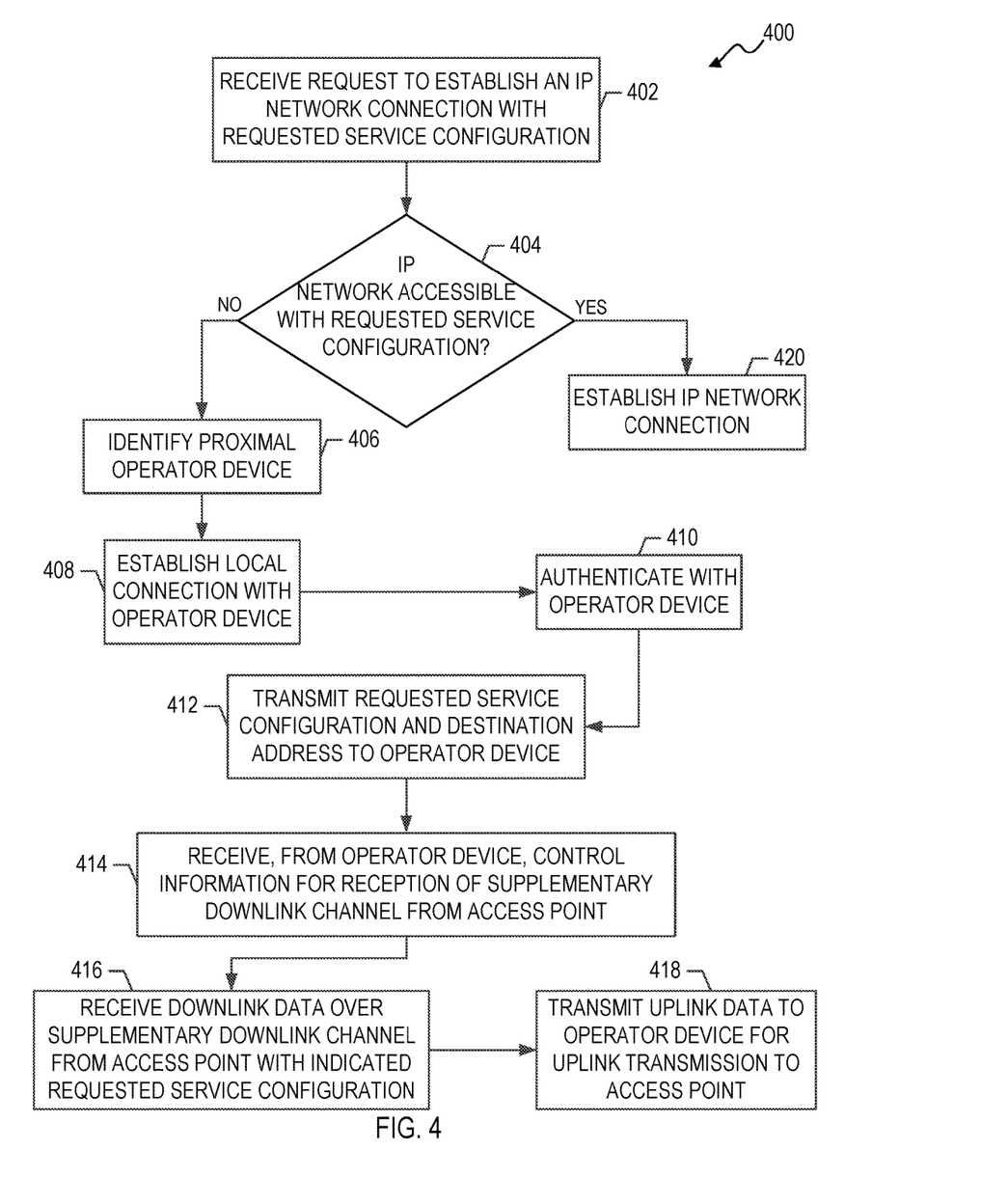
FIG. 4 illustrates a flow diagram of an example process of a non-operator device in a system for downlink channel access for non-operator devices in accordance with one or more implementations.

FIG. 4 illustrates a flow diagram of an example process 400 of a non-operator device 104 in a system for downlink channel access for non-operator devices in accordance with one or more implementations. For explanatory purposes, the example process 400 is primarily described herein with reference to the non-operator device 104 of FIGS. 1 and 3; however, the example process 400 is not limited to the non-operator device 104 of FIGS. 1 and 3, e.g. the example process 400 may be performed by other non-operator devices, and/or the example process 400 may be performed by one or more components of the non-operator device 104. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed. In one or more implementations, the example process 400 of the non-operator device 104 is performed for a particular application session; e.g. the example process 400 is application-driven.

The non-operator device 104 receives a request to establish a connection to an IP network 124 with a requested service configuration (which may include QoS parameters), such as from an application running on the non-operator device 104 (402). The non-operator device 104 determines whether the IP network 124 is accessible to the non-operator device 104 for establishing the connection with the requested service configuration, such as via a Wi-Fi connection (404). For example, if the QoS is low, or if no QoS is indicated, the non-operator device 104 may establish the connection to the IP network 124, e.g. via Wi-Fi (420). If the non-operator device 104 cannot establish the connection to the IP network 124 with the indicated QoS, the non-operator device 104 identifies a proximal operator device (406), such as the operator device 102. For example, the non-operator device 104 may discover the operator device 102 via one or more discovery protocols, such as Bluetooth discovery protocols, BLE discovery protocols, Wi-Fi Direct discovery protocols, or other discovery protocols.

The non-operator device 104 establishes a local connection with the operator device 102, such as via the Wi-Fi/Bluetooth transceiver 304 (408). In one or more implementations, the local connection can be point-to-point (e.g. Bluetooth, Wi-Fi Direct, etc.) and/or the local connection can be facilitated by a local controller (e.g. a Wi-Fi access point). The non-operator device 104 authenticates itself to the operator device 102 by running an authentication process over the local connection (410). In one or more implementations, the authentication process can be based on public-key cryptography, and/or a shared secret between the devices 102, 104. Upon successful authentication, a secure channel is established between the two devices 102, 104 via the local connection.

Once a secure channel is established between the two devices 102, 104, the non-operator device 104 transmits the request for the connection to the IP network 124 that includes the destination network address and the requested service configuration to the operator device 102 over the local connection (412). The operator device 102 may then facilitate provisioning the corresponding service-assured IP connection to the IP network 124 via the small cell access point 106 and the core mobile network infrastructure 112. The service-assured IP connection may be configured using a supplementary downlink channel on an unlicensed band, such as LTE-U, where the supplementary downlink channel is in carrier aggregation with a primary downlink channel of the operator device 102.

The non-operator device 104 receives, from the operator device 102 via the local connection, control information for reception of the supplementary downlink channel from the small cell access point 106 (414). The control information may include, for example frequency information, such as an assigned frequency, timing information, such as assigned timeslot, synchronization information, or generally any information that may be used to receive the supplementary downlink channel from the small cell access point 106.

The non-operator device 104 receives downlink data for the connection to the IP network 124 from the small cell access point 106 on the supplementary downlink channel with the requested service configuration via the unlicensed band receiver 314 (416). The non-operator device 104 transmits uplink user and/or control data associated with the connection to the IP network 124 to the operator device 102 via the local connection, e.g. using the Wi-Fi/Bluetooth transmitter 308 (418). The operator device 102 relays the uplink data to the small cell access point 106 for transmission to the core mobile network infrastructure 112 and the IP network 124.

Figure 5:
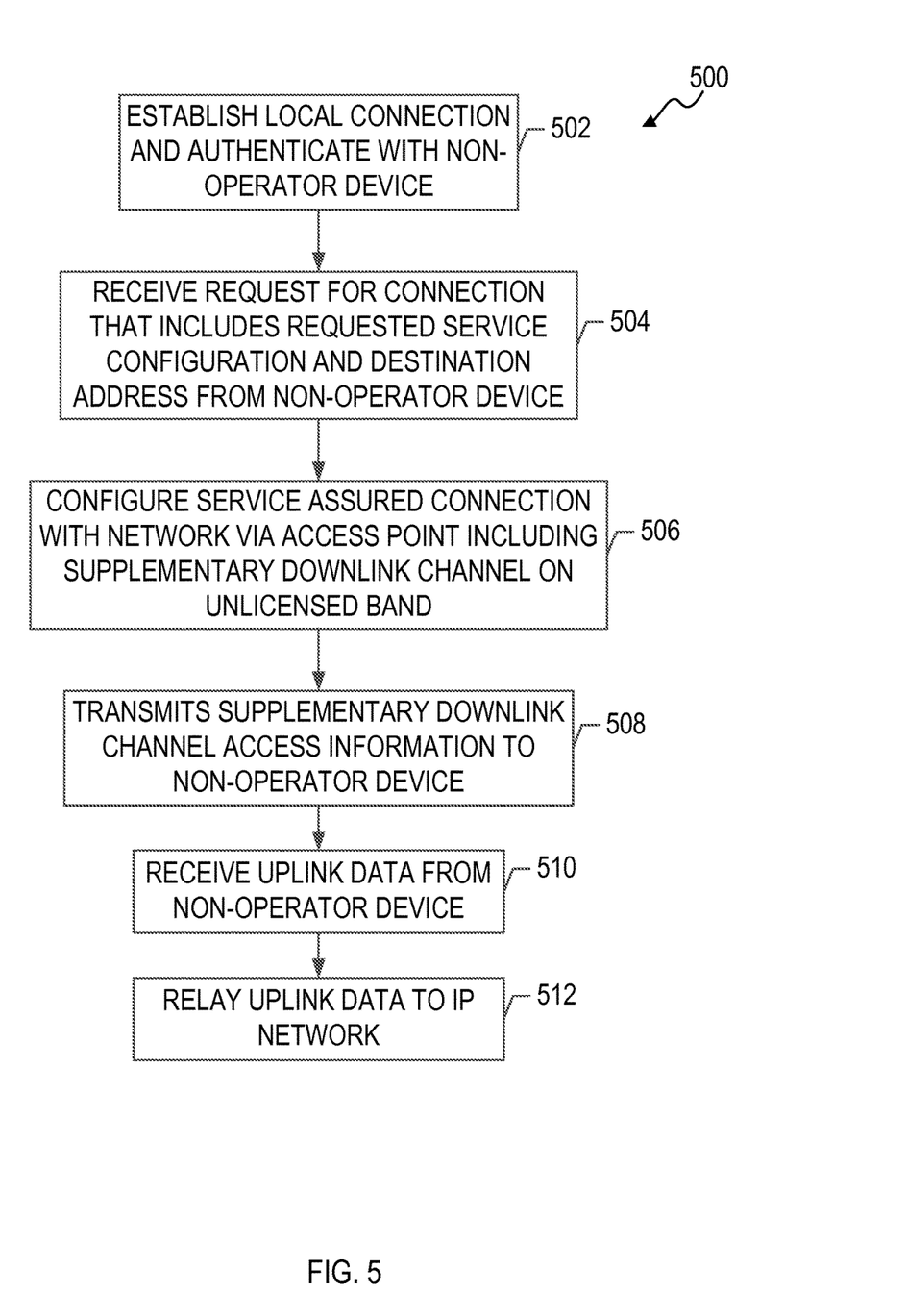
FIG. 5 illustrates a flow diagram of an example process of an operator device a system for downlink channel access for non-operator devices in accordance with one or more implementations.

FIG. 5 illustrates a flow diagram of an example process 500 of an operator device 102 in a system for downlink channel access for non-operator devices in accordance with one or more implementations. For explanatory purposes, the example process 500 is primarily described herein with reference to the operator device 102 of FIGS. 1-2; however, the example process 500 is not limited to the operator device 102 of FIGS. 1-2, e.g. the example process 500 may be performed by the operator device 103 of FIG. 1, or other operator devices, and/or the example process 500 may be performed by one or more components of the operator device 102. Further for explanatory purposes, the blocks of the example process 500 are described herein as occurring in serial, or linearly. However, multiple blocks of the example process 500 may occur in parallel. In addition, the blocks of the example process 500 may be performed a different order than the order shown and/or one or more of the blocks of the example process 500 may not be performed. In one or more implementations, the example process 500 of the operator device 102 is performed for a particular application session; e.g. the example process 500 is application-driven.

The operator device 102 establishes a local connection and authenticates with a requesting non-operator device, such as the non-operator device 104 (502). For example, the operator device 102 may receive a request from the non-operator device 104 to establish a Bluetooth and/or Wi-Fi connection, and the operator device 102 may establish the local connection (502) in response to the request. The operator device 102 receives a request for a connection to an external network, such as the IP network 124, from the non-operator device 104 that includes a destination address and an indication of a requested service configuration for the connection (504).

The operator device 102 facilitates configuring and provisioning the connection to the IP network 124 with the requested service configuration, including configuring the small cell access point 106 to provide a supplementary downlink channel on an unlicensed band (506). For example, the operator device 102 transmits a request for carrier aggregation to the small cell access point 106 with a component carrier including the primary downlink channel on a licensed band and a component carrier including the supplementary downlink on an unlicensed band. The operator device 102 also may communicate with the core mobile network infrastructure 112 to facilitate configuring the transmission of the downlink data for the supplementary downlink channel from the IP network 124 to the small cell access point 106 via the broadband network 110. For example, the operator device 102 may establish a downlink data channel from the IP network 124 to the small cell access point 106 via the broadband network 110.

Upon establishing the downlink data channel from the IP network 124 to the small cell access point 106 and configuring the air interface at the small cell access point 106 for transmission of the supplementary downlink channel, the operator device 102 transmits supplementary downlink channel access information to the non-operator device via the local connection, e.g. using the Wi-Fi/Bluetooth transceiver 204 (508). The operator device 102 receives uplink user and/or control data for the connection to the IP network 124 from the non-operator device 104 via the local connection, e.g. using the Wi-Fi/Bluetooth transceiver 204 (510). The operator device 102 relays the uplink data to the IP network 124, e.g. via the small cell access point 106, the broadband network 110, and the core mobile network infrastructure 112 (512). In one or more implementations, the operator device 102 may relay the uplink data to the IP network 124 via a different network pathway.

Figure 6:
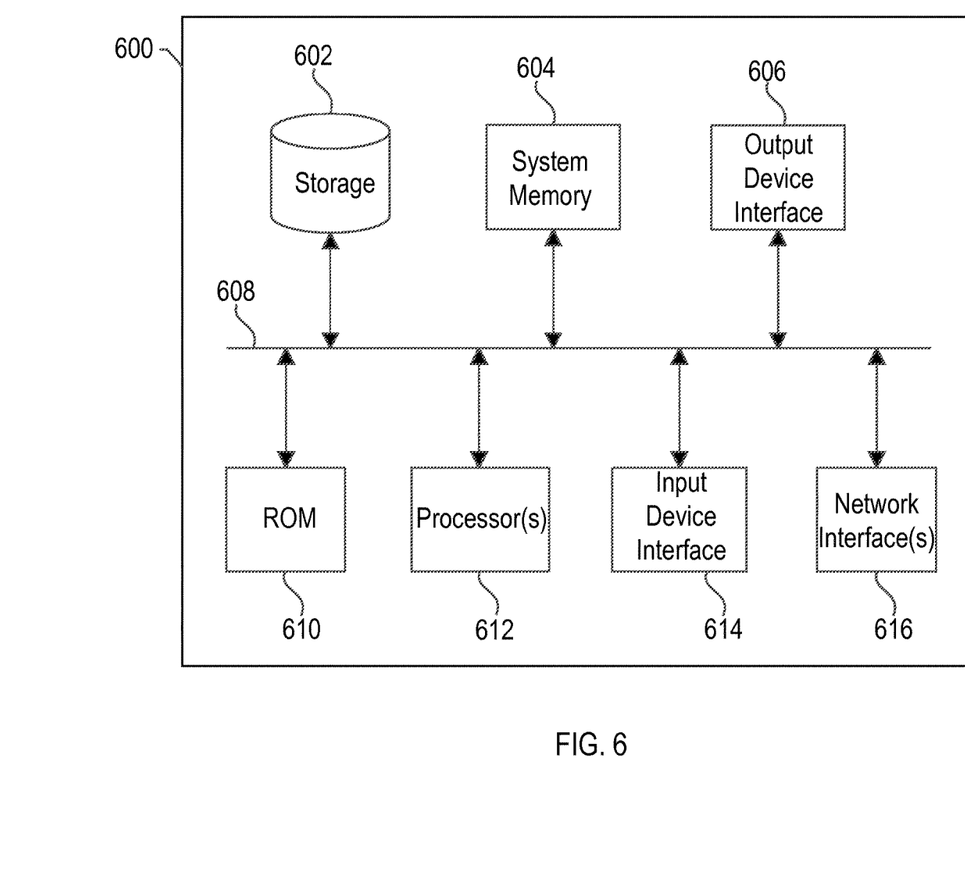
FIG. 6 conceptually illustrates an example electronic system with which one or more implementations of the subject technology can be implemented.

FIG. 6 conceptually illustrates an example electronic system 600 with which one or more implementations of the subject technology can be implemented. The electronic system 600, for example, may be, and/or may include, one or more of the operator devices 102, 103, the non-operator device 104, the small cell access point 106, the macrocell access point 108, the serving gateway 114, the MME 116, the PDN 118, the HSS 120, the AAA server 122, one or more wearable devices, a desktop computer, a laptop computer, a tablet device, a phone, and/or generally any electronic device. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, one or more network interface(s) 616, and/or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are utilized by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory (RAM). The system memory 604 may store one or more of the instructions and/or data that the one or more processing unit(s) 612 may utilize at runtime. In one or more implementations, the processes of the subject disclosure are stored in the system memory 604, the permanent storage device 602, and/or the ROM 610. From these various memory units, the one or more processing unit(s) 612 retrieve instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by the electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 6, bus 608 also couples electronic system 600 to one or more networks (not shown) through one or more network interface(s) 616. The one or more network interface(s) may include one or more of a Bluetooth interface, a Bluetooth low energy (BLE) interface, a Zigbee interface, an Ethernet interface, a Wi-Fi interface, a MoCA interface, a power line interface, a reduced gigabit media independent interface (RGMII), a cellular interface for communicating over licensed bands, a cellular interface for communicating over unlicensed bands, and/or generally any interface for connecting to a network. In this manner, electronic system 600 can be a part of one or more networks of computers, such as a telecommunications or cellular network, a local area network (LAN), a personal area network (PAN), a peer-to-peer network (P2P), a wide area network (WAN), an Intranet, or a network of networks, such as the Internet. Any or all components of electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of" at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    a memory configured to store instructions; and
    at least one processor coupled to the memory and configured to execute the instructions to:
        establish a local connection with an operator device that is serviced by a network operator;
        provide, to the operator device over the local connection, a request to establish a connection to a network, the request comprising a destination address of the network;
        receive, from the operator device over the local connection, control information for reception of a downlink channel provisioned by the network operator for the operator device; and
        receive, using the control information for reception of the downlink channel, downlink data associated with the destination address on the downlink channel directly from an access point associated with the network operator, the access point being distinct from the operator device.

2. The device of claim 1, wherein the request further comprises an indication of a requested service configuration associated with the connection to the network and the at least one processor is further configured to execute the instructions to:
    receive downlink data associated with the destination address on the downlink channel with the requested service configuration.

3. The device of claim 2, wherein the at least one processor is further configured to execute the instructions to:
    locally receive the request to establish the connection to the network;
    determine that the connection to the network cannot be established by the device with the requested service configuration; and
    in response thereto, identify the operator device that is serviced by the network operator and establishing the local connection with the identified operator device.

4. The device of claim 3, wherein the at least one processor is further configured to execute the instructions to:
    receive an advertiser message from the operator device, the advertiser message indicating that the operator device can facilitate establishing the downlink channel for the device with allowed service configuration.

5. The device of claim 1, wherein the at least one processor is further configured to execute the instructions to:
    authenticate with the operator device over the local connection; and
    upon authenticating, establish a secure channel over the local connection.

6. The device of claim 1, wherein the device is not being serviced by the network operator.

7. The device of claim 1, wherein the network comprises an internet protocol (IP) network.

8. The device of claim 1, wherein the network operator comprises a mobile network operator, the access point comprises a small cell access point, the downlink channel comprises a supplementary downlink channel that is associated through carrier aggregation with a primary downlink channel provided by the small cell access point to the operator device.

9. The device of claim 8, wherein the supplementary downlink channel is on an unlicensed frequency band and the primary downlink channel is on a licensed frequency band.

10. The device of claim 9, wherein the device is exclusive of a transmitter for providing uplink transmissions on the unlicensed frequency band.

11. The device of claim 1, wherein the local connection comprises at least one of a Bluetooth connection, a Wi-Fi connection, or a near field communication (NFC) connection.

12. The device of claim 1, wherein the control information comprises at least one of frequency information or timing information for the reception of the downlink channel.

13. A method comprising:
    establishing a local connection with a device that is not serviced by a network operator;
    receiving, from the device over the local connection, a request to establish a connection to a network, the request comprising a destination address of the network;
    facilitating establishment of the connection to the destination address of the network via the network operator and establishment of a downlink channel for receiving downlink data associated with the destination address; and
    providing, to the device over the local connection, control information for reception of the downlink channel from an access point associated with the network operator, wherein the device is configured to receive, using the control information, the downlink data associated with the destination address on the downlink channel directly from the access point associated with the network operator.

14. The method of claim 13, further comprising:
    authenticating the device over the local connection.

15. The method of claim 13, wherein the request further comprises an indication of a requested service configuration for the connection and facilitating the establishment of the connection further comprises:
    facilitating the establishment of the connection having the requested service configuration.

16. The method of claim 13, wherein the local connection comprises at least one of a Bluetooth connection, a Wi-Fi connection, or a near field communication (NFC) connection.

17. The method of claim 16, wherein the network operator comprises a mobile network operator, the access point comprises a small cell access point, the downlink channel comprises a supplementary downlink channel on an unlicensed frequency band that is associated through carrier aggregation with a primary downlink channel on a licensed frequency band, and the network comprises an internet protocol (IP) network.

18. A computer program product comprising instructions stored in a non-transitory computer-readable storage medium, the instructions comprising:
    instructions to establish, by a device, a local connection with a network device that is serviced by a mobile network operator;
    instructions to provide, to the network device over the local connection, a request to establish a connection to a network, the request comprising a network address and an indication of a requested service configuration for the connection to the network;
    instructions to receive, from the network device, control information for reception of a supplementary downlink channel of an access point associated with the mobile network operator, the supplementary downlink channel being established on an unlicensed frequency band; and
    instructions to receive, using the control information, downlink data associated with the connection to the network on the supplementary downlink channel from the access point and having the requested service configuration, the access point being distinct from the device.

19. The computer program product of claim 18, further comprising:
    instructions to locally receive the request to establish the connection to the network;
    instructions to determine that the connection to the network cannot be established with the requested service configuration; and
    in response thereto, instructions to identify the network device that is serviced by the mobile network operator and establishing the local connection with the identified network device.

20. The computer program product of claim 18, wherein the device is not serviced by the mobile network operator and the supplementary downlink channel is associated with a primary downlink channel and a control channel of the network device through carrier aggregation, the primary downlink channel being on a licensed frequency band.

* * * * *